April 21, 1936.  S. F. GLEASON  2,037,892

METHOD OF PROCESSING AND MOLDING MEATS

Filed Aug. 23, 1933

INVENTOR
Stanley F. Gleason,
BY Louis Necho
ATTORNEY

Patented Apr. 21, 1936

2,037,892

UNITED STATES PATENT OFFICE 2,037,892

METHOD OF PROCESSING AND MOLDING MEATS

Stanley F. Gleason, Philadelphia, Pa., assignor to Ham Boiler Corporation, Port Chester, N. Y., a corporation of Delaware Application August 23, 1933, Serial No. 686,357

1 Claim. (Cl. 99—107)

My invention relates to a new and useful method of processing and molding meats, and more particularly boned meats, such as hams and the like, which are processed or partly cooked preparatory to sale and distribution and which are preferably molded into a generally rectangular or oval form for the purposes of handling and in order to produce a product which is sliceable uniformly, this application relating to the class of invention disclosed in my copending application Serial No. 602,365 filed March 31, 1932 on Process and apparatus for cooking hams, and containing part of the subject matter disclosed in said copending application.

As is well known, hams and other boned meats of this character are usually treated with preserving and curing liquids, which process is commonly referred to in the trade as "pickling". During this curing process the meats thus treated tend to absorb and retain more of the curing liquids than is absolutely necessary for their proper curing and preservation, which curing liquids, while not positively harmful or unsanitary, are neverthless not a necessary aid to health and have an undesirable effect upon the appearance, flavor and constituency of the meat. It therefore is desirable in the processing of such cured meats to eliminate as much of the excess curing liquids as is possible, without however, at the same time, causing an undue loss of the natural juices, extracts, and other desirable elements contained in the meat.

In processing meats of this character it has heretofore been the practice to place the meat in a container or mold and to subject such meat to pressure and temperature, with the meat completely confined between the pressure element and the walls of the container so that it is processed in its own juices, such juices being completely confined with the meat processed, and it has also been the practice to place the meat in a container and subject the meat to pressure and temperature, the container being liquid tight, but the juices extruded from the meat by the pressure and temperature being permitted to escape into the container above the pressure element.

The former method resulted in the meat having excessive liquid content, thus producing difficulty in subsequent slicing of the meat, preventing the extrudance from the meat of the undesirab'e curing liquids with which the meat is saturated, preventing the proper molding of the meat due to the formation of liquid pockets in the chamber in which the meat is confined, and also greatly reducing the keeping qualities of the meat, since, as is well known, a certain degree of dryness is necessary to prevent undue, rapid deterioration and spoilage of the meat. The latter method resulted in undue shrinkage of the meat thus processed, as well as in undue loss of the desirable natural juices and flavor of the meat. Another disadvantage of this latter method consisted in the fact that the juices extruded from the meat being confined within the container accumulated above the pressure element, thus resulting in undue hardship and difficulty in the cleaning of the parts in order to comply with the prevailing sanitary requirements.

It is therefore the object of my invention to obviate these disadvantages and to produce a novel method of processing meats which, while permitting partial escape of the juices extruded from the meat during the processing thereof, will nevertheless result in retaining a sufficient amount of the natural juices thereof in the meat, thus preventing undue shrinkage as well as the presence of undue qualities of liquid in the finished product and at the same time permitting proper molding of the meat and eliminating the jelling of the juices extruded from the meat on the walls of the container above the pressure plate.

To the above ends, my invention consists in placing the meat in a mold or container, subjecting the meat to the desired pressure and temperature, and permitting partial escape of the juices extruded from the meat directly into the cooking liquid in which the container containing the meat to be processed is immersed, and at the same time preventing the ingress of the cooking liquid or medium into the container to prevent contamination of the meat contained therein.

In order to illustrate my novel method, I have shown in the accompanying drawing one form of apparatus which can be advantageously used to carry out my method, in which.

Figure 1:
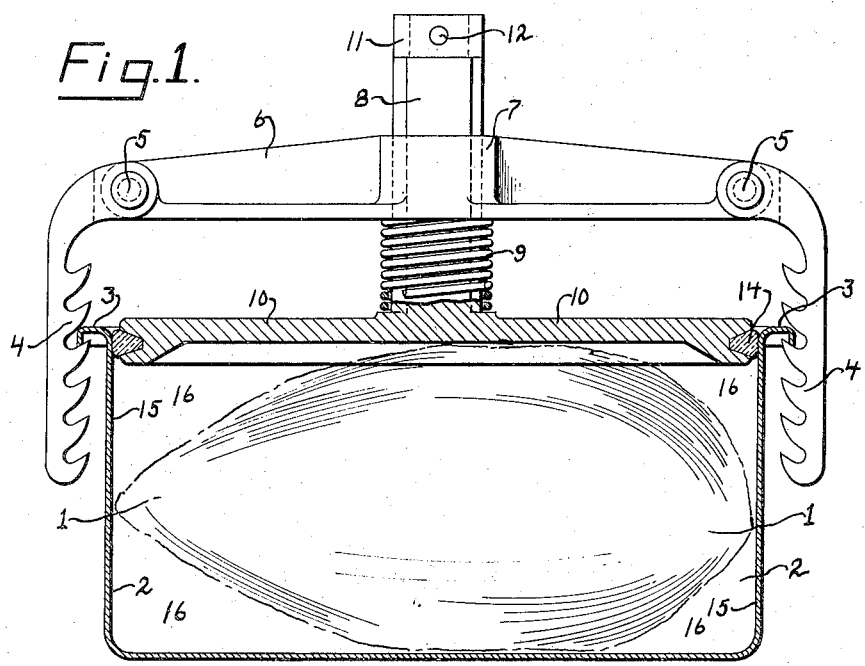
Fig. 1 is a vertical view partly in section and partly in elevation illustrating the position of the parts and the condition of the meat at the beginning of the processing operation.

In carrying out my novel method I place the meat 1 in a container 2 which has the flange 3 adapted to engage the ratchet 4 pivoted at 5 to a cross bar 6. The meat, as diagrammatically illustrated in Fig. 1, is of a non-uniform contour, such as the conventional ham after it has been boned out before it is processed and molded.

Figure 2:
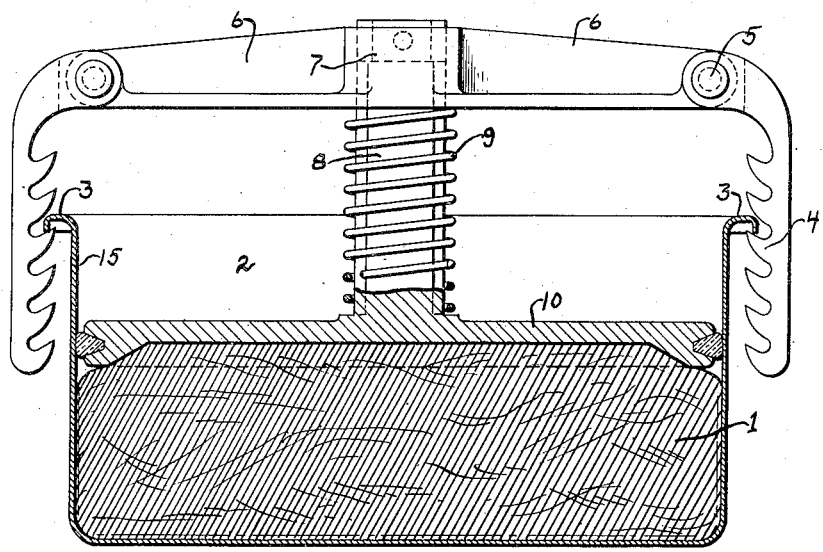
Fig. 2 is a view similar to Fig. 1 illustrating the position of the parts at the end of the processing operation.

In a hub 7 of the cross bar 6 is adapted to slide the rod or arm 8 which carries the spring 9 which is confined between the cross bar 6 and the follower or pressure plate 10 which is carried at the bottom of the arm 8. The arm 8 is provided at its upper end with a retaining ring 11 and a pin 12 which serve to prevent disconnection of the follower plate 10 and the rod 8 from the cross bar 6 when the ratchet 4 is disengaged from the flange 3, and which at the same time permits movement of the rod 8 with respect to the cross bar 6, as shown in Figs. 1 and 2. The follower plate 10 is provided with a gasket 14 which is suitably secured to the periphery thereof and which is adapted to form a sliding seal between the follower plate 10 and the vertical walls 15 of the casing 2. The gasket 14 can be supported by, secured to, or otherwise associated with the follower plate 10 in any desirable manner and is formed of a flexible, resilient material to permit the gasket to flex or give under a predetermined amount of pressure.

The operation is as follows: The meat 1 is placed in the container 2, and the follower plate 10 is positioned within the casing 2, as shown, and downward pressure is applied to the cross bar 6 to compress the spring 9 to the desired extent, whereupon the pivoted ratchets 4 are made to engage the flange 3 to retain the parts in the position shown in Fig. 1. Thereupon the casing 2 containing the meat and compressed as shown is immersed in the hot water used for processing the meat, and as the meat 1 is subjected to the pressure of the plate 10 and the temperature of the cooking water certain juices are extruded from the meat into the pockets 16 formed in the container, due to the irregularity of the contour of the meat. As the juices are extruded from the meat and as the meat softens under the influence of the temperature to which it is subjected, the meat gradually spreads out and tends to assume the form of the container 2 under the pressure of the spring 9 acting on the plate 10. As more of the juices of the meat are extruded and as the meat softens more and more under the influence of the temperature of the cooking water, it tends more and more to assume the form of the casing in which it is contained and the yielding resilient or flexible gasket 14 yields when the pressure within the casing 2 has reached a predetermined amount to permit some of the juices confined between the follower plate 10 and the walls of the casing 2 to escape between the gasket 14 and the vertical walls 15 of the casing 2 into the cooking water in which the container is immersed. As the pressure under the follower plate is thus somewhat relieved, the action of the spring 9 on the plate 10 forces the plate 10 further down upon the meat until the meat has assumed the form of the container, as shown in Fig. 2. It will thus be seen that the resilient and/or flexible gasket 14 acts as a one-way valve or seal to permit the partial egress of the juices extruded from the meat into the cooking liquid without permitting the ingress of the cooking liquid to contaminate the meat. It will also be seen that by regulating the degree of resiliency and flexibility of the gasket 14, as well as the compressing action of the spring 9 on the plate 10, the egress of the juices extruded from the meat into the cooking liquid can be accurately controlled, to the end that the meat thus processed is not deprived of all of its juices and is at the same time not permitted to retain more of its juices than is necessary for its proper constituency as a finished product. By this method a saving in shrinkage is effected, which is consistent with the maximum desirable amount of juices retained, since if all the juices extruded from the meat during the processing operation are permitted to escape there is an undue shrinkage and loss in the meat, and the flavor and nourishing qualities of the meat thus produced are defective, while, on the other hand, if all of the juices are retained in the meat the opposite results, namely: that the meat thus produced will have an excessive liquid content, which subjects it to early deterioration, and which causes great difficulty in the slicing thereof, and which in addition to preventing the proper molding of the meat, due to the formation of liquid pockets within the mold, also retains in the meat all the curing liquids with which the meat was treated prior to the processing thereof. Furthermore, the juices permitted to escape by the one-way action of my resilient, flexible gasket 14 escape directly into the cooking liquid and hence do not tend to jell or congeal on the walls of the casing above the follower plate 10, as well as on the upper surface of the follower plate 10, the spring 9, the rod 8, etc.

After the meat has been sufficiently processed the mold is permitted to cool until the contents thereof have contracted and congealed into a uniform, homogeneous mass having the shape dictated by the form and contour of the mold.

Having thus described my invention, what I claim as new and desire to secure by Letters Patent is:

The method of processing meat which consists in placing the meat in a mold, subjecting said meat within said mold to a following pressure, subjecting the meat to heat to produce partial softening thereof and to cause extrudance of some of the juices of the meat into the mold, and permitting partial escape of said juices from said mold, while preventing ingress of extraneous matter into the mold, the escape of juices from said mold and the prevention of the ingress of extraneous matter into said mold being effected by means of a flexible, one way seal, movable with the follower plate.

STANLEY F. GLEASON.